(12) United States Patent
Chang

(10) Patent No.: US 8,773,572 B2
(45) Date of Patent: Jul. 8, 2014

(54) OPTICAL IMAGING MODULE WITH FIXED-FOCUS LENS

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 574 days.

(21) Appl. No.: 12/756,121

(22) Filed: Apr. 7, 2010

(65) Prior Publication Data

US 2011/0075021 A1 Mar. 31, 2011

(30) Foreign Application Priority Data

Sep. 30, 2009 (CN) .......................... 2009 1 0308015

(51) Int. Cl.
*H04N 5/225* (2006.01)
(52) U.S. Cl.
USPC .......................................... 348/340; 348/374
(58) Field of Classification Search
None
See application file for complete search history.

(56) References Cited

U.S. PATENT DOCUMENTS

| | | | | |
|---|---|---|---|---|
| 6,734,419 B1* | 5/2004 | Glenn et al. | ................... | 250/239 |
| 2001/0050717 A1* | 12/2001 | Yamada et al. | ............... | 348/340 |
| 2002/0131782 A1* | 9/2002 | Yamaguchi et al. | .......... | 396/429 |
| 2005/0141106 A1* | 6/2005 | Lee et al. | ...................... | 359/808 |
| 2006/0202293 A1* | 9/2006 | Bogdan et al. | ................ | 257/432 |
| 2006/0215053 A1* | 9/2006 | Kinoshita | ..................... | 348/335 |
| 2006/0219885 A1* | 10/2006 | Kinoshita et al. | ............. | 250/239 |
| 2007/0120213 A1* | 5/2007 | Hiew et al. | ..................... | 257/433 |
| 2008/0265134 A1* | 10/2008 | Kinoshita | ..................... | 250/206 |
| 2008/0267603 A1* | 10/2008 | Jung et al. | ..................... | 396/111 |
| 2008/0278621 A1* | 11/2008 | Cho et al. | ...................... | 348/374 |

FOREIGN PATENT DOCUMENTS

CN 1842139 A 10/2006

* cited by examiner

*Primary Examiner* — Justin P Misleh
(74) *Attorney, Agent, or Firm* — Novak Druce Connolly Bove + Quigg LLP

(57) ABSTRACT

An exemplary imaging module includes a substrate, an image sensor, a lens barrel, a lens, and a holder. The image sensor is fixed on the substrate, the lens barrel is connected to the substrate to enclose the image sensor, the lens is received in the lens barrel, and the holder is connected to the lens barrel and partially receives the lens barrel therein. The lens barrel includes an elastic protruding portion protruding from the inner surface thereof. The inner surface of the protruding portion elastically abuts a side surface of the lens.

18 Claims, 2 Drawing Sheets

OPTICAL IMAGING MODULE WITH FIXED-FOCUS LENS

BACKGROUND

1. Technical Field

The present disclosure relates to imaging modules, and particularly relates to an optical imaging module with a fixed-focus lens.

2. Description of Related Art

With the ongoing progress of imaging technology, imaging modules are becoming more and more compact. An imaging module often employs a fixed-focus lens. In assembly of the imaging module, the fixed-focus lens is positioned such that the focus of the fixed-focus lens is on an imaging surface of an image sensor of the imaging module. Then the fixed-focus lens is fixed in position relative to the image sensor. Currently, the position of the fixed-focus lens is adjusted by screwing. However, it is difficult to make a screw thread on the imaging module, and the need for a screw thread increases the cost of the imaging module. In addition, the shape of the fixed-focus lens, and associated optical components such as a lens barrel, must be circular. Therefore, design options for these components are limited.

What is needed, therefore, is an imaging module to overcome the above-mentioned problems.

BRIEF DESCRIPTION OF THE DRAWINGS

The components of the drawings are not necessarily drawn to scale, the emphasis instead being placed upon clearly illustrating the principles of embodiments of the present imaging module. Moreover, in the drawings, like reference numerals designate corresponding parts throughout the views.

DETAILED DESCRIPTION

Figure 1:
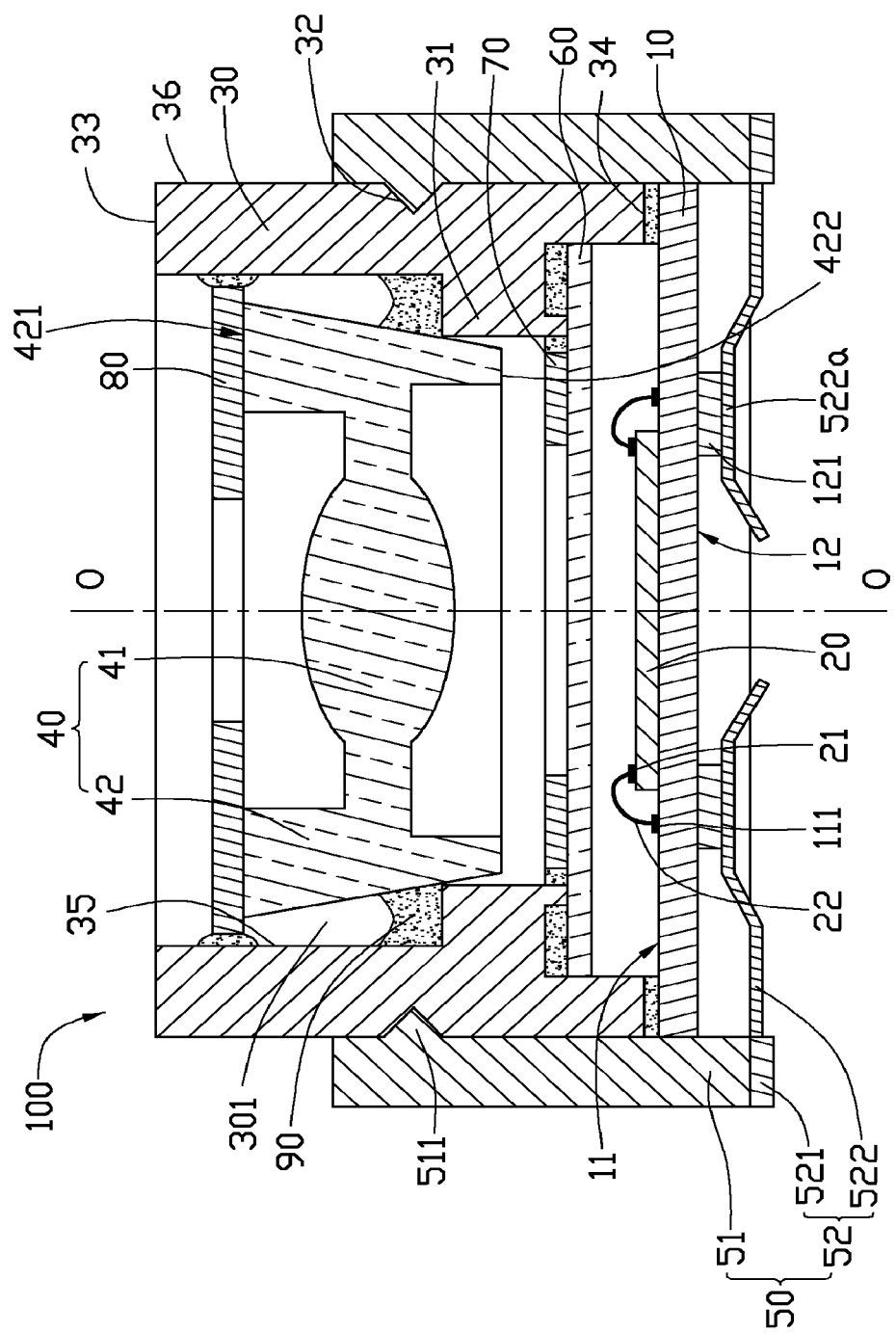
FIG. 1 is a cross sectional view of an imaging module, according to a first exemplary embodiment of the present disclosure.

Referring to FIG. 1, an imaging module 100, according to a first exemplary embodiment, is shown. The imaging module 100 includes a substrate 10, an image sensor 20, a lens barrel 30, a lens 40, and a holder 50. The image sensor 20 is fixed on the substrate 10. The lens 40 is received in the lens barrel 30. The substrate 10 is fixed on an end of the lens barrel 30. The lens barrel 30 is partially inserted into the holder 50.

The substrate 10 includes a first surface 11 and a second surface 12 at opposite sides thereof. The substrate 10 includes a plurality of first soldering pads 111 formed on the first surface 11, and a plurality of first connecting portions 121 formed on the second surface 12. Each first soldering pad 111 is electrically connected to a corresponding first connecting portion 121.

The image sensor 20 is fixed on the first surface 11. The image sensor 20 includes a plurality of second soldering pads 21 each connected to one first soldering pad 111 using one wire 22.

The lens barrel 30 is connected to the substrate 10 to enclose the image sensor 20. The lens barrel 30 defines a receiving hole 301 passing through the lens barrel 30 from an object end 33 to an image end 34 of the lens barrel 30. The lens barrel 30 includes an inner side surface 35 surrounding the receiving hole 301, the inner side surface 35 is an interface between the lens barrel 30 and the receiving hole 301. The lens barrel 30 includes a protruding portion 31 positioned in the receiving hole 301, the protruding portion 31 is formed on the inner side surface 35 and protrudes from the inner side surface 35 to an optical axis O-O of the imaging module 100. The protruding portion 31 is elastic and can be elastically deformed relative to the inner side surface 35 of the lens barrel 30. In this embodiment, the protruding portion 31 is made of rubber. In one embodiment, the protruding portion 31 can be annular. The lens barrel 30 defines a groove 32 in an outer side surface 36 thereof. In one embodiment, the groove 32 can be annular.

The lens 40 includes a central optical portion 41, and a supporting portion 42 around the optical portion 41. The optical portion 41 is formed as a convex lens for converging passing light. The supporting portion 42 is integrally connected to the optical portion 41 to support the optical portion 41 in the lens barrel 30. That is, the optical portion 41 and the supporting portion 42 are portions of a single, one-piece, monolithic body that is the lens 40. The supporting portion 42 includes a planar object side surface 421 close to an object side of the imaging module 100 and a planar image side surface 422 close to an image side of the imaging module 100. A size of the object side surface 421 is larger than that of the image side surface 422. The outside diameter of the supporting portion 42 gradually reduces from the object side to the image side of the image module 100. A part of the supporting portion 42 near the image side of the imaging module 100 is inserted into the protruding portion 31 of the lens barrel 30. Because the protruding portion 31 is elastic, the inserting distance of the supporting portion 42 is determined by the inserting (pressing) force applied on the lens 40. Therefore, a fixing position of the lens 40 can be adjusted by adjusting the pressing force. When the supporting portion 42 of the lens 40 is inserted into a predetermined position, the lens 40 is further secured in position in the lens barrel 30 by adhesive 90. In this embodiment, the adhesive 90 is located on an annular path around the outer surface of the supporting portion 42, and interconnects the supporting portion 42, a top wall of the protruding portion 31, and an adjacent part of the inner surface of the lens barrel 30. With the above-described configuration, there is no need for a conventional screwing structure. Thus, the cost of the image module 100 can be reduced. In addition, the design options possible for the lens 40 are more numerous than is the case where a screwing structure is required.

The holder 50 includes a peripheral side wall 51, and a number of connecting members 52 fixed on the side wall 51. The side wall 51 partially receives the lens barrel 30. The side wall 51 includes an engaging portion 511 on an inner surface corresponding to the groove 32 of the lens barrel 30. In one embodiment, the engaging portion 511 can be annular. In assembly, the engaging portion 511 is engaged into the groove 32. Thus, the lens barrel 30 is fixed to the holder 50. Each of the connecting members 52 includes a third soldering pad 521 and a second connecting portion 522. The third soldering pad 521 is fixed on an end of the side wall 51. One end of the second connecting portion 522 is fixedly connected to the third soldering pad 521, and the other end of the second connecting portion 522 abuts against a corresponding first connecting portion 121 of the substrate 10 in the holder 50. In this embodiment, each of the second connecting portions 522 includes a contacting section 522a in contact with the corresponding first connecting portion 121. The contacting section 522a resiliently abuts against the corresponding first connecting portion 121. Alternatively, the second connecting portions 522 can be jointed to the corresponding first connecting portions 121 via solder.

The imaging module 100 further includes an infrared filter 60, a first shielding member 70, and a second shielding member 80. The infrared filter 60 is fixed in the lens barrel 30 between the first shielding member 70 and the image sensor 20. The first shielding member 70 is fixed in the lens barrel 30 between the infrared filter 60 and the lens 40. The second shielding member 80 is attached to an end of the lens 40 near the object side of the imaging module 100. In one embodiment, the second shielding member 80 is attached and supported on the object side surface 421 of the supporting portion 40. The infrared filter 60 is configured to keep infrared light from reaching the image sensor 20. The first shielding member 70 and the second shielding member 80 are configured for keeping undesired visible light from reaching the image sensor 20. In this embodiment, the infrared filter 60, the first shielding member 70 and the second shielding member 80 are fixed in the lens barrel 30 by glue (not labeled).

Figure 2:
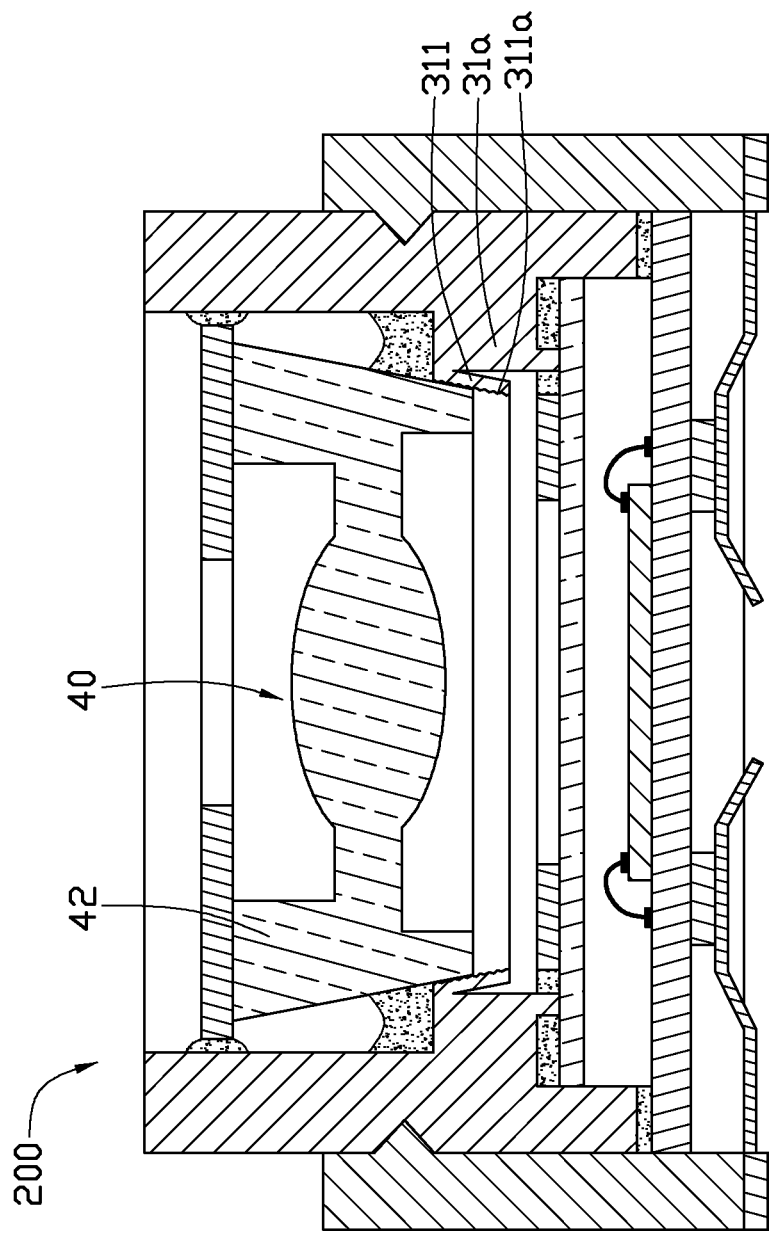
FIG. 2 is a cross sectional view of an imaging module, according to a second exemplary embodiment of the present disclosure.

Referring to FIG. 2, an imaging module 200, according to a second exemplary embodiment, is shown. In this embodiment, a protruding portion 31a includes an elastic adjusting section 311. The elastic adjusting section 311 is generally a hollow, circular truncated cone in shape. The inside diameter of the adjusting section 311 gradually reduces from the object side to the image side of the imaging module 200, and an end of the adjusting section 311 nearest the object side of the imaging module 200 is integrally connected with the protruding portion 31a. That is, the protruding portion 31a is a single, one-piece, monolithic body that includes the adjusting section 311. The adjusting section 311 defines a number of adjusting grooves 311a in an inner surface thereof. In this embodiment, the adjusting grooves 311a are annular. The supporting portion 42 of the lens 40 is inserted into the adjusting section 311, and an inserted end of the supporting portion 42 is engaged in one of the adjusting grooves 311a. A position of the lens 40 can be adjusted by engaging the inserted end of the supporting portion 42 in a selected one of the different adjusting grooves 311a.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An imaging module, comprising:
   a substrate;
   an image sensor fixed on the substrate;
   a lens barrel connected to the substrate to enclose the image sensor, the lens barrel defining a receiving hole, the lens barrel comprising an inner side surface serving as an interface between the lens barrel and the receiving hole, the lens barrel comprising an elastic protruding portion positioned in the receiving hole, the protruding portion being formed on the inner side surface and protruding from the inner side surface to an optical axis of the imaging module;
   at least one lens received in the receiving hole of the lens barrel, an inner surface of the protruding portion elastically abutting a side surface of the at least one lens; and
   a holder connected to the lens barrel and partially receiving the lens barrel therein.

2. The imaging module of claim 1, wherein the substrate comprises a first surface and a second surface at opposite sides thereof.

3. The imaging module of claim 2, wherein the substrate comprises a plurality of first soldering pads formed on the first surface and a plurality of first connecting portions formed on the second surface, each first connecting portion is electrically connected to a corresponding one of the first soldering pads, and the image sensor comprises a plurality of second soldering pads each connected to a corresponding first soldering pad.

4. The imaging module of claim 3, wherein the holder comprises a peripheral side wall, and the side wall partially receives the lens barrel therein.

5. The imaging module of claim 4, wherein the lens barrel defines a groove in an outer surface thereof, the side wall of the holder comprises an engaging portion on an inner surface corresponding to the groove of the lens barrel, and the engaging portion is engaged in the groove.

6. The imaging module of claim 4, wherein the holder further comprises a plurality of connecting members fixed on an end of the side wall thereof, each of the connecting members comprises a third soldering pad and a second connecting portion, the third soldering pad is fixed on the end of the side wall, one end of the second connecting portion is fixedly connected to the third soldering pad, and the other end of the second connecting portion abuts against a corresponding first connecting portion of the substrate in the holder.

7. The imaging module of claim 6, wherein each of the second connecting portions comprises a contacting section resiliently abutting against the corresponding first connecting portion.

8. The imaging module of claim 1, wherein the at least one lens comprises a central optical portion and a supporting portion around the optical portion, the optical portion is formed as a convex lens for converging passing light, and the supporting portion is configured for supporting the optical portion in the lens barrel.

9. The imaging module of claim 8, wherein an outside diameter of the supporting portion gradually reduces from an object side to an image side of the imaging module, and a part of the supporting portion nearest the image side of the imaging module is received in the protruding portion of the lens barrel.

10. The imaging module of claim 1, further comprising an infrared filter, a first shielding member and a second shielding member, wherein the infrared filter is fixed in the lens barrel between the first shielding member and the image sensor, the first shielding member is fixed in the lens barrel between the infrared filter and the at least one lens, and the second shielding member is attached to an object side end of the at least one lens.

11. The imaging module of claim 1, wherein the at least one lens is further secured in position in the lens barrel by adhesive.

12. The imaging module of claim 11, wherein the adhesive interconnects the side surface of the at least one lens, the protruding portion, and the inner surface of the lens barrel.

13. An imaging module, comprising:
    an image sensor fixed on the substrate;
    a lens barrel connected to the substrate to enclose the image sensor, the lens barrel comprising an elastic protruding portion protruding from an inner surface thereof to an optical axis of the imaging module, the protruding portion comprising an elastic adjusting section, the adjusting section defining a plurality of adjusting grooves in its surface, the adjusting grooves providing spans of different sizes as measured perpendicular to the optical axis, the different sized spans gradually reducing from an adjusting groove nearest an object side of the imaging module to an adjusting groove nearest to an image side of the imaging module;

at least one lens received in the lens barrel, an inner surface of the adjusting section elastically abutting a side surface of the at least one lens, the at least one lens comprising a central optical portion and a supporting portion around the optical portion for supporting the optical portion in the lens barrel, the supporting portion being received in the adjusting section, and an inserted end of the supporting portion being engaging in one of the adjusting grooves; and a holder connected to the lens barrel and partially receiving the lens barrel therein.

14. The imaging module of claim 13, wherein the optical portion is formed as a convex lens for converging passing light.

15. The imaging module of claim 14, wherein an outside diameter of the supporting portion gradually reduces from an object side to an image side of the imaging module, and a part of the supporting portion nearest the image side of the imaging module is inserted in the elastic adjusting section of the protruding portion of the lens barrel.

16. The imaging module of claim 13, wherein the adjusting grooves are annular.

17. The imaging module of claim 13, wherein an inside diameter of the adjusting section gradually reduces from an object side to an image side of the imaging module, and an end of the adjusting section nearest the object side of the imaging module is integrally connected to a main body of the protruding portion.

18. An imaging module, comprising:

a substrate;

an image sensor fixed on the substrate;

a lens barrel connected to the substrate to enclose the image sensor, the lens barrel defining a receiving hole therein, the lens barrel comprising an elastic protruding portion positioned in the receiving hole;

a lens received in the lens barrel, a peripheral side of the lens being directly and elastically supported on the protruding portion; and a holder connected to the lens barrel and partially receiving the lens barrel therein, wherein the lens comprises a central optical portion and a tapered supporting portion around the optical portion for supporting the optical portion in the lens barrel, the supporting portion comprises a planar object side surface close to an object side of the imaging module and a planar image side surface close to an image side of the imaging module, a size of the object side surface is larger than a size of the image side surface.

* * * * *